W. A. Wood.
Harvester Cutter.
Nº 15264.  Patented Jul. 1, 1856.
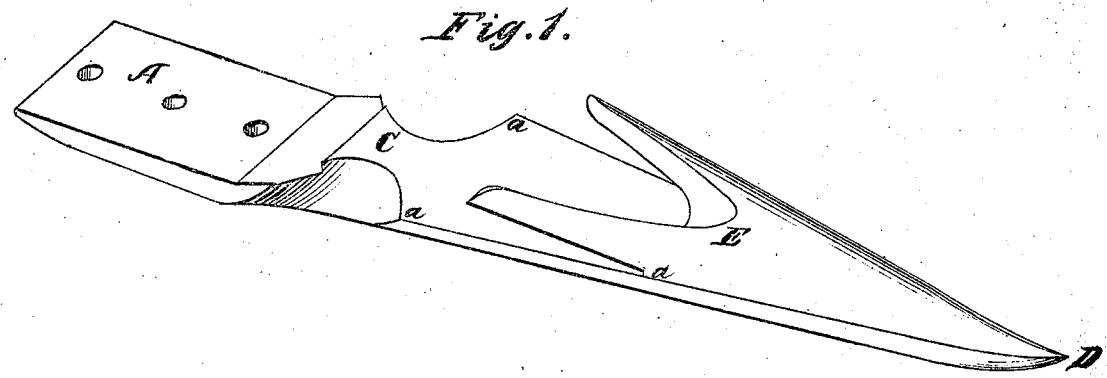
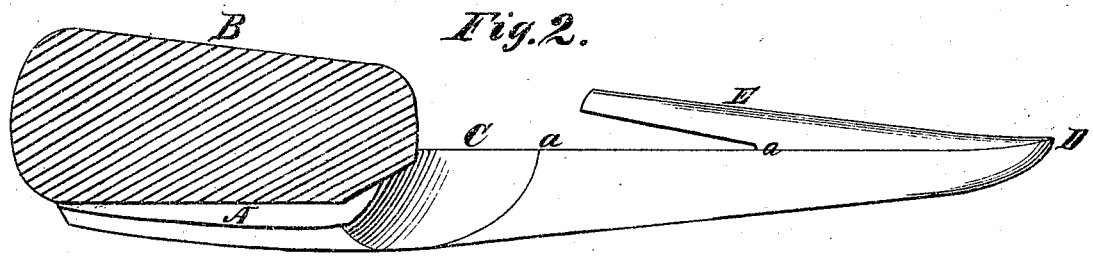

UNITED STATES PATENT OFFICE.

WALTER A. WOOD, OF HOOSICK FALLS, NEW YORK.

IMPROVED GUARD-FINGER FOR HARVESTERS.

Specification forming part of Letters Patent No. 15,264, dated July 1, 1856.

*To all whom it may concern:*

Be it known that I, WALTER A. WOOD, of Hoosick Falls, in the county of Rensselaer and State of New York, have invented certain new and useful Improvements in Guard-Fingers for Harvesters; and I do hereby declare the following to be a full, clear, and exact description of the same, reference being had to the accompanying drawings, making a part thereof, in which—

Figure 1 represents a perspective view of the finger. Fig. 2 represents a side view of the same as attached to the finger beam or bar.

There are two classes of fingers or guards used in harvesting-machines—viz., the narrow and wide, the former varying from one-half to one and one-fourth inch in width, and the latter from one and one-half to two and three-fourth inches in width. Each of these kinds has its merit and demerit; and the object of my invention is to retain in one guard the advantages of each kind without their injurious tendencies. The main value of a narrow guard is its lightness; but unless they are set close together the efficiency of the machine is sacrificed to a trifling original expense. The light or narrow guard may also be let into the finger-bar more readily than the wide one. The advantage of a wide guard is, first, that a fewer number is required on the machine, and the fewer the number (taking other matters hereinafter mentioned into consideration) the less the repairs and the the greater saving of power in cutting. By way of drawing a more definite distinction, take two machines, one having guards two and one-half inches wide, the other three-fourths of an inch. Put the same number of guards on each machine—that is, so that the distance in each case from center to center of the guards shall be the same. It is obvious that the wide guard will cut the easiest and closest to the ground, for the reason that the space between their edges is less and the grass has not so far to be pushed or carried to the edge of the guard where it is cut by the sickle, and is of course cut in a more upright position. There is the further advantage of taper or slope in the wide guard, which allows the grass to be sheared off instead of being cut square off, as against a narrow guard, which of necessity has but little if any taper. This establishes the superiority of the wide guard over the narrow one; but a wide guard cannot be used without a recess or neck between the cutting part of the guard and the cutter-bar, for without the recess or neck fine dry grass and fibers of grass will accumulate on the guard under the sickle-bar (on which the knives are riveted) and clog its action. The neck, therefore, should be as narrow as possible, having due regard to necessary strength. Wide guards are necessarily fastened to the bottom of the finger-bar. The necessary thickness of the finger-bar when made of wood is from one and three-fourths to two inches, and to allow the cut grass to readily pass over this bar the shear-edges of the finger must be raised up to allow the grass to freely pass over said bar. Here, then, are two conditions in the finger-bar which must be provided for—viz., securing it under the bar, but making its shear-edges up near the top of the bar or a line passing over the bar.

To distinguish my guard from those where a reversed angle for the sickle to cut against is used, I would mention that my recess is back of the cut and in no way used for the sickle to cut against.

My invention consists in the peculiar form and construction of the finger-guard, as will be now described.

The heel of the guard is recessed or dropped down, as seen at A, so that it may be secured to the under side of the finger-bar B, as seen in Fig. 2. In front of this recess is the neck portion C of the guard. At this point the guard has greatest depth, to compensate for the metal taken away at the sides to form the neck, the object of the neck being to prevent the gumming or clogging under the sickle or sickle-bar. In advance of the neck C the guard widens out to its greatest width, and from these widened-out points it tapers to the point D. The guard has a forked cap, E, on its top, under which the sickles vibrate, and that portion of the guard between the points $a\ a$ has an acute edge against which the sickle acts shear fashion. By this construction I get all the essential features of the two kinds of guards without any of their bad features—viz., the raising up of the grass to freely pass over the bar B, the sloping sides for the sickle to cut against, the narrow neck to prevent gumming and clogging, and the facility for fastening the guard under the bar, but still keeping its edges against which the sickle acts high enough up to allow the grass to pass over.

It will thus be perceived that I have united in what is termed the "wide guard" or "finger" elements not heretofore united in one guard—viz., the raised cutting-edges, the narrow neck, the rear depression, and the forked cap, all of which aid to facilitate the cutting and readily pass the cut grass over the finger-bar.

Having thus fully described the nature of my invention, what I claim therein as new, and desire to secure by Letters Patent, is—

The particular form and construction of the finger or guard, as herein represented—viz., with the forked cap E, recess or depression A, raised edges $a\ a$, and neck C behind them, by means of which the cutting is facilitated, in the manner set forth.

WALTER A. WOOD.

Witnesses:
E. KIRKLAND,
F. H. FESSENDEN.